United States Patent Office 3,076,226
Patented Feb. 5, 1963

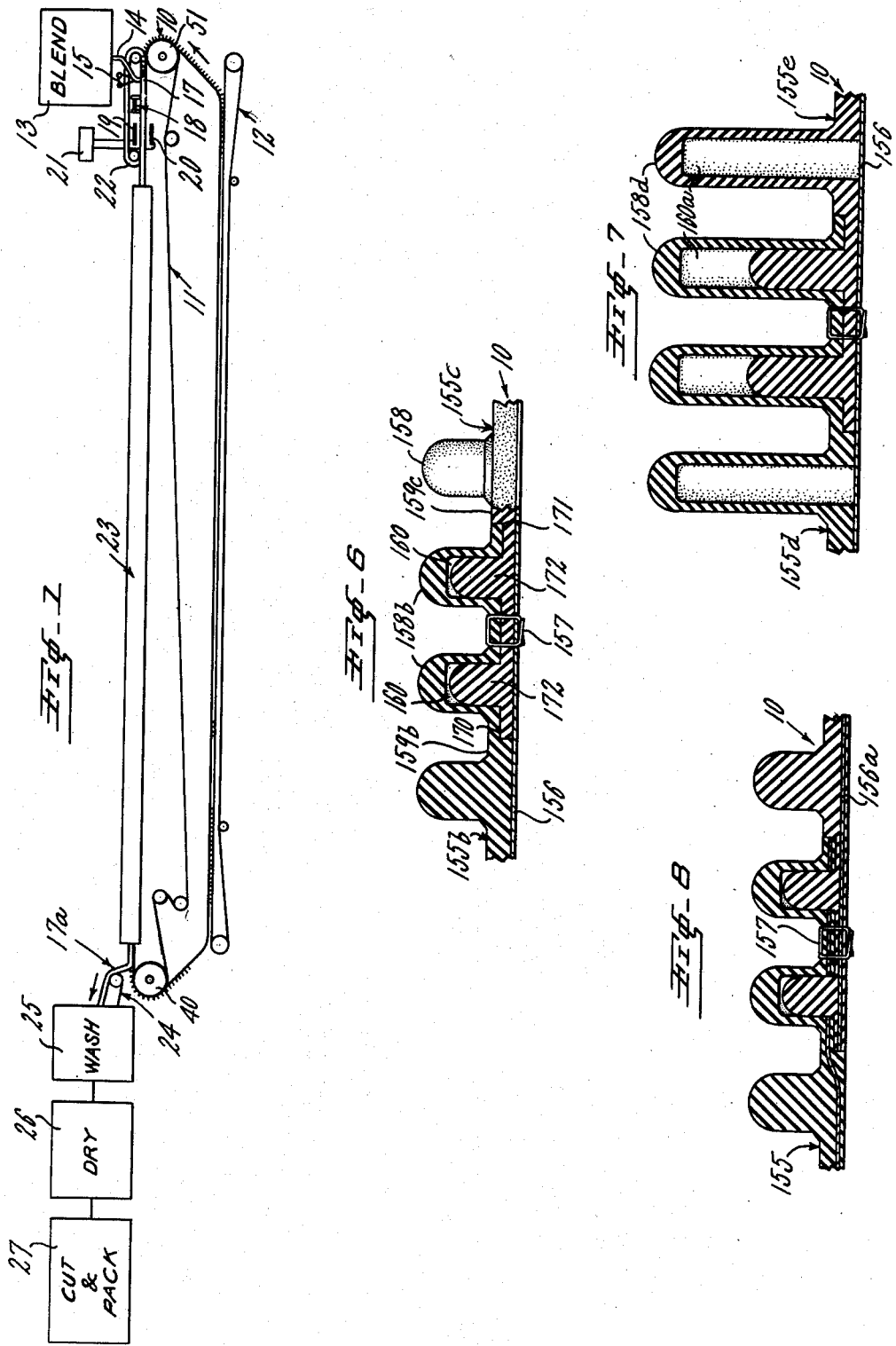

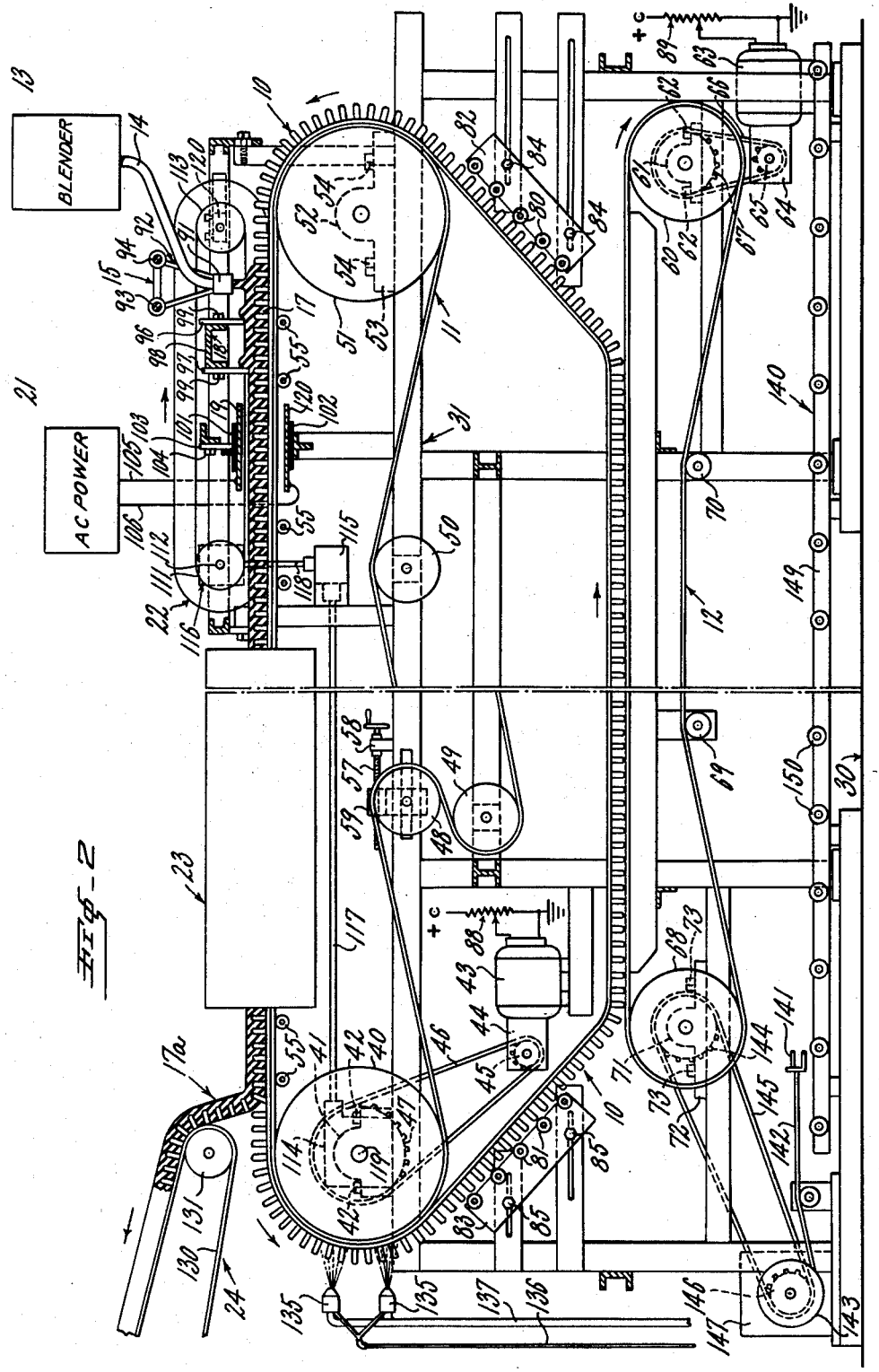

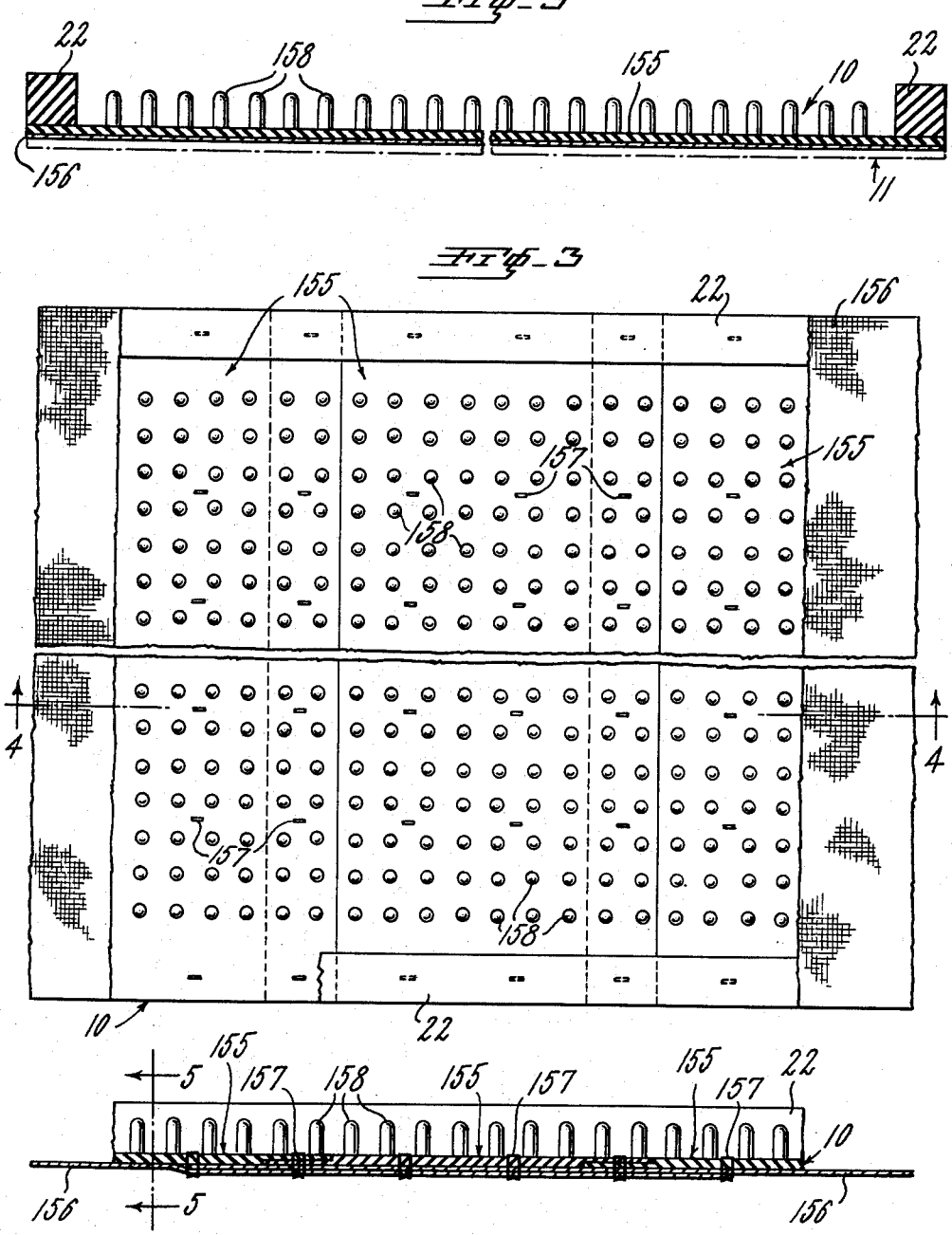

3,076,226
APPARATUS FOR MAKING SHEETS OF
FOAM RUBBER
Robert O. Borton and Garvin L. Beck, Santa Ana, Calif., assignors to United States Rubber Company, New York, N.Y., a corporation of New Jersey
Filed Feb. 17, 1960, Ser. No. 9,342
6 Claims. (Cl. 18—4)

This invention relates to an apparatus for manufacturing articles from frothed latex. More particularly, it relates to a method and apparatus for making continuous sheets of cored foam rubber, that is, sheets of unseamed cored foamed latex having predetermined width and thickness, but having lengths selectable at will upon the completion of the manufacture thereof.

Heretofore, apparatus and methods which seemingly are or could be adapted to the manufacture of continuous sheets of cored foam rubber have been known in the art. Examples of such apparatus and methods are disclosed in U.S. Patent 2,757,415 to Mathues et al. and U.S. Patent 2,395,920 to Te Grotenhuis. However, due perhaps to the high cost of the special apparatus involved, it is not believed that continuous sheets of cored foam rubber have been marketed in appreciable quantities prior to the present invention. Continuous sheets of uncored foam rubber, known in the art as "flatstock," have previously commonly been manufactured and sold, as have various cored foam rubber articles such as cushions and mattresses. These latter articles have conventionally been poured and cured in individual molds.

It is an object of the present invention to provide a new and improved method of manufacture of continuous sheets of cored latex foam.

It is another object of the invention to provide new and improved apparatus suited to the practice of the aforesaid method.

It is another object of the invention to provide apparatus suited to the low cost adaptation of conventional equipment for making continuous sheets of uncored latex foam to the production of continuous sheets of cored latex foam.

It is a further object of the invention to provide an apparatus for making continuous sheets of cored latex foam which are compatible with the employment of radio frequency dielectric gelling as a step or element thereof.

It is a still further object of the invention to provide apparatus which is speedily convertible to the low cost production of continuous sheets of cored or uncored latex foam and to various thicknesses of each.

For a better understanding of the present invention together with other and further objects thereof, reference is had to the following description, take in connection with the accompanying drawings, and its scope will be pointed out in the appended claims.

In the drawings:

FIG. 1 is a diagrammatic representation of apparatus for making continuous sheets of cored latex foam and of the process steps preceding and succeeding said apparatus.

FIG. 2 is a more detailed schematic side elevational view of an apparatus for making cored latex foam, partially sectioned and partially broken away for purposes of clarity.

FIG. 3 is a plan view of a portion of a pour belt used in the apparatus of FIG. 2, partially broken away.

FIG. 4 is a sectional view on line 4—4 of FIG. 3.

FIG. 5 is a sectional view on line 5—5 of FIG. 4.

FIG. 6 is a fragmentary, partially sectioned view of the belt of FIG. 3 showing details of construction thereof.

FIGS. 7 and 8 correspond to FIG. 6 and show modifications of the invention.

Referring now to the drawings, wherein like reference numerals denote corresponding parts throughout the several views, in FIG. 1 only the major elements of the apparatus for making continuous sheets of cored foam rubber have been diagrammatically shown, supporting structural members, driving means and all details of construction having been omitted for the sake of clarity. Process steps of a conventional nature which precede and succeed the employment of the apparatus of this invention in a complete process of manufacture of cored foam rubber are shown diagrammatically.

The apparatus, portions of which will be more completely described hereinafter, includes an endless pour belt 10 which is progressively transported in an endless path through the various work operation stations, hereinafter described, by driven belt conveyors 11 and 12. As the pour belt 10 moves in an endless path, latex and gelling agent are continuously blended and frothed with air in any conventional blender 13, details of which are not shown. The frothed latex then passes continuously from the blender 13 through the flexible hose 14, the other end of which is secured to a nozzle on the traversing mechanism 15. While the traversing mechanism 15 continuously moves the nozzle end of hose 14 back and forth across and above the moving pour belt 10 a foam of frothed latex 17 is progressively deposited on the pour belt 10. Continued progressive movement of the pour belt 10 causes the foam 17 to pass beneath the leveling mechanism 18 which levels and evenly distributes the foam 17 on the pour belt 10. Thereafter, the foam laden pour belt 10 passes progressively between the electrode plates 19 and 20, between which a high frequency electrical field is generated when said electrodes 19 and 20 are energized by a suitable source 21 of A.C. current. In passing through this high frequency electrical field, the foam 17 is heated and, thereby, caused to gel. Throughout the pouring, leveling and gelling steps the foam 17 is restrained from flowing over the sides of the pour belt 10 by a pair of deckle belts 22, only one of which is shown in FIG. 1 for purposes of clarity, said deckle belts 22 being so arranged and driven as to rest upon and travel with the edges of the pour belt 10. After gelling, the foam 17 is progressively transported, still on the pour belt 10, through conventional curing oven 23, from which it emerges as a continuous sheet of cured foam rubber 17a. After curing the foam 17a is progressively stripped from the pour belt 10 by the driven transfer conveyor 24 disposed above the path of travel of the pour belt 10. The foam 17a is then progressively fed into conventional washing equipment 25 for washing with water and is dried in a conventional drier 26. Thereafter, it is cut and packed to order by conventional cutting and packing means 27. Since neither apparatus for methods for washing, drying, cutting and packing form part of the present invention and since conventional apparatus and methods for accomplishing these steps are well known in the art, no details thereof are shown herein.

Referring now to FIG. 2, in which the apparatus of the present invention is shown in greater detail, all of the functional members of the apparatus are supported from the floor or foundation 30 by a suitable rigid structural frame 31, portions of which will be more particularly referred to hereinafter.

Conveyor belt 11 is driven in the direction shown by drive pulley 40 which is mounted in bearing blocks 41 affixed to frame 31 by means of a plurality of bolt 42. D.C. motor 43, through integral gear box 44, sprocket 45, chain 46 and sprocket 47, drives pulley 40, conveyor belt 11 is driven in an endless path around drive pulley 40 take-up roll 48, guide rolls 49 and 50, and tail pulley 51. Tail pulley 51 is mounted in suitable bearing blocks 52, only one of which is shown, which are affixed to bases 53. Bases 53 are slidably mounted on frame 31 and may be fixed in various positions by means of a plurality of bolts 54. Take-up roll 48 is slidably mounted on frame 31 and may be adjusted to various positions thereon, by means of horizontal worm drives 57, only one of which is shown, attached, through blocks 58, to frame 31 and, through bearing blocks 59, to each end of roll 48, in order to take up slack in belt 11. Guide rolls 49 and 50 are mounted on frame 31 in positions substantially as shown so as to cooperate with take-up roll 48 and pulleys 40 and 51 in providing proper tension in belt 11 and proper frictional contact between belt 11 and pulley 40. At its uppermost horizontal path of travel, belt 11 is supported by a plurality of rollers 55 which, in turn, are supported by members, not shown, of frame 31.

Conveyor belt 12 is driven by drive pulley 60 which is mounted in suitable bearing blocks 61 affixed to frame 31 by means of a plurality of bolts 62. D.C. motor 63 drives pulley 60 through integral gear box 64, sprocket 65, chain 66 and sprocket 67. Belt 12 is driven in an endless path around drive pulley 60 and tail pulley 68, the slack underside of the belt 12 being supported by guide rolls 69 and 70 mounted on frame 31. Tail pulley 68 is mounted in suitable bearing blocks 71 affixed to bases 72 which are slidably mounted on frame 31, said bases 72 being capable of being affixed in various positions on frame 31 by means of a plurality of bolts 73, the position of bases 72 and pulley 68 being variable for the purpose of taking up slack in belt 12.

Pour belt 10, which will be described in more detail hereinafter, is transported in an endless path in the direction shown by conveyor belts 11 and 12. As will be seen from FIG. 2, this means of transport results in belt 10 being subjected to very little tensile loading. As further means of minimizing belt tension in belt 10, it is supported during its travel between conveyor belts 11 and 12 by a plurality of guide rollers 80 and 81 mounted in roller frames 82 and 83 which, in turn, are slidably mounted on structural frame 31 and may be affixed in various positions thereon by means of bolts 84 and 85.

D.C. motors 43 and 63 are controlled by rheostats 88 and 89 which may be carefully adjusted to insure that belt 11 travels at the same speed as belt 12.

A froth of one or more latexes, a gelling agent, such as sodium silicofluoride, and air is blended in conventional blender 13, details of which are not shown. Any conventional blender such as those described in U.S. Patent 2,695,246 to Jurgensen et al., 2,706,108 to Miner, or 2,731,253 to Spencer, may be used with the apparatus of this invention. The blended latex foam is passed through the flexible tube 14 to the nozzle 91 where it is deposited as a froth 17 on moving pour belt 10. Nozzle 91 is attached to a conventional traversing mechanism 15, only parts of which are shown. The slider 92 carrying nozzle 91 is so driven, by means not shown, as to pass back and forth over pour belt 10 in a direction perpendicular to the path of travel of belt 10. Slider 92 travels on rods 93 and 94 which are connected to and supported by members of frame 31 not shown.

The froth of latex foam 17 is then passed, with continued movement of belt 10, beneath the scraper assembly 18. Scraper assembly 18 comprises two scraper blades 96 and 97 mounted on a cross piece 98 by means of a plurality of bolts 99, cross piece 98 being affixed to frame 31. Blades 96 and 97 are provided with slots, not shown, for bolts 99 so that they can be adjusted to various heights above belt 10. Blade 96 is set at a slightly greater height than blade 97 so that leveling and smoothing of the foam 17 is accomplished in two stages. As shown in FIG. 2, banks of foam 17 are maintained ahead of each blade 96 and 97 so that there will be no voids in the leveled foam 17.

The leveled foam 17 is then conveyed on belt 10 between the electrode plates 19 and 20. The electrode plates 19 and 20 are supported from frame 31 and electrically insulated therefrom by insulating material 101 and 102. Bottom plate 20 is permanently fixed in position, whereas top plate 19 is mounted to be vertically adjustable by means of slotted member 103 and bolts 104. Vertical adjustment of electrode 19 results in more or less heat being generated in the foam 17 depending upon the distance between electrodes 19 and 20. Plate electrodes 19 and 20 are connected by means of electrical leads 105 and 106 to a suitable source 21 of A.C. power, such as a 20 kw. Girdler Thermex Unit. Frequencies of 6.7 megacycles have proved satisfactory. When the plates 19 and 20 are excited, a high frequency electrical field is produced between them which causes the froth of latex foam 17 to gel into a flexible spongy sheet.

Throughout the pouring, leveling and gelling zones of the apparatus, the foam 17 is restrained from flowing over the sides of the pour belt 10 by a pair deckle belts 22, only one of which is shown, which travel with and rest one upon each edge of the pour belt 10. Deckle belts 22 are driven by drive pulleys 111 mounted on shaft 112 and travel in an endless path around drive pulleys 111, tail pulleys 113 and, in contact with pour belt 10, back to drive pulleys 111. Shaft 112, in turn, is driven by a direct mechanical linkage comprising gear boxes 114, 115 and 116 and shafts 117 and 118 from the shaft 119 of drive pulley 40. This mechanical linkage is so designed and constructed as to cause deckle belts 22 to travel at the same speed as belt 11 throughout the zone of contact between belts 22 and belt 10. The tail pulleys 113 are mounted in bearing blocks 120 which, in turn, are slidably mounted on frame 31 so as to be capable of being fixed in various positions in order to maintain proper tension in belts 22.

After gelling, the foam 17 is carried on the belt 10 through conventional curing oven 23, details of which are not shown. Oven 23 may be supported from frame 31 or may be separately supported from floor 30. While various types of curing ovens well known in the art could be used with this apparatus, in actual practice a curing oven similar in construction to the one disclosed in U.S. Patent 2,441,235 to Blair et al. has been found to be satisfactory.

After passing through the curing oven 23, the cured foam 17a is stripped from the pour belt 10 by progressively passing the foam 17a onto the belt conveyor 24 positioned above the path of travel of the pour belt 10, that is, interposed between the foam 17a and the belt 10. Belt conveyor 24, which transports the cured foam, after stripping, into the washing apparatus 25, shown diagrammatically in FIG. 1, comprises conveyor belt 130, tail pulley 131 and driving and speed control means, not shown, similar to those employed in the drive of belt 12. The rate of travel of belt 130 is accurately controlled to the same speed as that of belt 11. It will be appreciated that the belt conveyor 24 functions essentially as a stripping roller in stripping foam 17a from belt 10, and that a simple roller could be substituted therefor if other means were provided for transporting and maintaining a pull on foam 17a. Stripping has been found to be best accomplished by positioning pulley 131, relative to the path of travel of belt 10, so that the foam 17a is pulled from the belt 10 at nearly a right angle.

After the foam 17a has been stripped therefrom, pour belt 10 progressively continues on its endless path of travel past a plurality of spray nozzles 135 which are supplied, under pressure, with water soluble wax and air by the piping systems 136 and 137. The nozzles 135 progressively deposit an even film of wax over the entire surface of pour belt 10 which prevents the foam 17 from sticking thereto. Deckle belts 22 are also progressively and continuously lubricated with wax or silicone oil by conventional means not shown.

When it is desired to remove the pour belt 10 from the apparatus of FIG. 2 and to produce continuous sheets of uncored foam rubber by pouring and transporting same through the apparatus directly upon the flat conveyor belt 11, pour belt 10 may be broken at a joint, to be described hereinafter, and stored half on conveyor belt 12 and half on storage rack 140. For the purpose of moving the pour belt 10 into the storage position, clamp 141 affixed to cable 142 is run out and upwards around pulley 60 and attached to the lower free end of the belt 10 which will have been broken at a joint position immediately to the left, as shown in FIG. 2, of roller frame 82. Then cable 142 is rewound on drum 143 in order to draw the belt 10 into the storage position on the storage rack 140. Drum 143 is driven from tail pulley 68 through a conventional mechanical drive linkage which may comprise, as shown, sprocket 144 affixed to pulley 68, chain 145, and sprocket 146 which may be engaged with drum 143 by means of mechanical clutch 147. In this manner the speeds of belt 12 and cable 142 are synchronized. Storage rack 140 comprises frame 149 and a plurality of rollers 150. In removing the pour belt 10 to the storage position and in returning it to the operating position, belt 11 is driven as required in order to aid in the transport of belt 10.

Referring now particularly to FIGS. 3, 4 and 5, the pour belt 10 is comprised of a plurality of rubber mats 155 which are overlapped and interlocked, by a means to be described hereinafter, at their ends and are thereafter affixed to a length of suitable relatively unstretchable woven fabric 156, such as cotton duck, by means of a plurality of metal staples 157.

The length of belt thus formed is joined at its ends to form an endless belt by a joint as shown in FIG. 4. The ends of the fabric 156 are lapped, an additional mat 155 is inserted between and interlocked with the two end mats 155 on the aforementioned length of belt, and the final staples 157 are applied.

The mats 155 are provided, on one surface thereof, with a plurality of integral finger-like core projections 158. While these projections 158 may be arranged on the mats 155 in any desired pattern or at random and may include core projections of varying heighth and cross-section, in the most common application of the invention, as shown here, a regular repeating pattern of projections 158 is provided, all of said projections being of circular cross-section and of equal height and diameter. As is shown, the projections 158 are so arranged as to form a continuous pattern over the joints between mats 155 and in the belt region adjacent to the operating position of the deckle belts 22.

As is best shown in FIG. 5, when the pour belt 10 is passing through the pour station on the apparatus, it rests upon flat belt 11 and, in turn, carries the deckle belts 22 one on each of its edges.

In the past, it has been believed that the presence of metal, such as the staples 157, in a high frequency electrical field, such as that generated in this apparatus between plate electrodes 19 and 20, would cause shorting out of the field and fires due to heating of the metal. This has not been found to be true in the case of the pour belt 10 shown here. As shown in FIGS. 3 and 4, in the present invention the staples 157 have been applied sparingly only as necessary to make the mats 155 and fabric 158 function as a unified structure.

While a pour belt 10 comprised of rubber mats is described herein, it will be appreciated that mats formed of any suitable flexible, non-metallic material, such as a synthetic resin, could be employed.

Referring now to FIG. 6, which shows, in detail, a cross-section of the region of the joint between two mats 155b and 155c in a pour belt 10 for making one inch thick sheets of cored foam rubber, with the exceptions hereinafter noted, all of the core projections 158 on both mats 155b and 155c are of the same height and cross-section, are solid and are formed integral with bases 159b and 159c of the mats 155b and 155c. As shown, however, the core projections 158b in the end two rows on the mat 155b are provided on their undersides with cylindrical recesses 160. Also, in the region of the end two rows of projections 158b, the base 159b is reduced to approximately one-half thickness by a recess 170 in the bottom surface of the mat 155b extending the entire width thereof. On mat 155c, the region thereof where the end two rows of core projections 158 would normally be positioned if the pattern were extended to the end of the mat 155c is reduced to approximately one-half thickness by a recess 171 in the top surface of the mat 155c extending the entire width thereof. Upon the top surface of this region of reduced cross-sectional thickness on mat 155c are situated two rows of integral projections 172 of lesser height and smaller diameter than the core projections 158. These projections 172 are so constructed and arranged as to fit tightly into the recesses 160. When the mats 155b and 155c are assembled end to end, as shown, projections 172 mate with recesses 160 and recess 171 mates with recess 170 to form a snugly interlocked lap joint between the two mats 155b and 155c in such a way that there is no appreciable variation in the combined cross-sectional thickness of the bases 159b and 159c and no irregularity in the pattern of projections 158 across the joint. Such a joint is sometimes referred to as a peg and socket joint. As previously indicated, after the mats 155b and 155c have been further interlocked they are further joined to each other and to a strip of suitable fabric 156 by means of a plurality of staples 157.

The opposite end, not shown, of mat 155b is constructed identically with the end of mat 155c shown, and the opposite end, not shown, of mat 155c is constructed identically with the end of mat 155b shown, the mats 155b and 155c, being, therefore, of identical construction throughout. Consequently, any number of mats 155 may be joined together as shown to form a belt of any desired length, and two or more mats may be joined to form an endless pour belt 10.

In practice, it has been found that, while a joint comprising a single row of interlocking projections 158b and 172 is satisfactory for most purposes, a double row of interlock as shown in FIG. 6 provides a more secure, troublefree joint. No appreciable advantages of a joint comprising an interlock of three or more rows over the two row interlock has been noted.

FIG. 7 shows a cross-sectional view of a joint between two mats 155d and 155e in a pour belt 10a for making two inch thick sheets of cored foam rubber. These mats 155d and 155e are identical with the mats 155b and 155c shown in FIG. 6 except for height of projections and for the fact that all of the core projections 158d, including those in the joint region, are formed hollow with cylindrical recesses 160a in the undersides. This hollow core construction results in a lighter weight belt.

FIG. 8 shows another variation of construction of the mats 155 comprising the pour belt 10. This belt construction is in all respects identical to that shown in FIG. 6 except that each mat 155 is constructed with a sheet of a suitable relatively unstretchable, woven fabric 156a embedded therein adjacent to the underside thereof. In this construction, the external backing strip of fabric 156 is omitted and staples 157 are used only at the joints between mats since the mats themselves will not tend to stretch appreciably. Also in this construction, all staples 157 may be omitted, but the joints between mats 155 may then have to be checked more frequently for tightness.

In the practice of this invention employing the above described apparatus it is first assumed that the apparatus is assembled as shown in FIG. 2. Motors 43 and 63, as well as the drive for the transfer conveyor 24 and the material handling drives in the washer and drier, are started and adjusted so that all belts travel at an equal speed. This causes the pour belt 10 to move in the endless path as shown in FIG. 2. The desired speed of travel of all belts is set by the optimum curing for the foam, which, in turn, is dependent upon the thickness of the foam sheet 17a and the latex formulation used.

Next, the flow of wax and air is started to the spray nozzles 135 and the pour belt 10 is thoroughly lubricated. Deckle belts 22 are also lubricated prior to the pouring of foam 17. The traversing mechanism 15 is then set in motion and the apparatus is ready for pouring of foam. Natural rubber latex, a synthetic latex or blend of natural and synthetic latexes, and other compounding ingredients compounded in accordance with standard compounding methods for the production of foam rubber, are passed through the blender 13 and are blended with a gelling agent, such as sodium silicofluoride, and a controlled amount of air to produce foam of the desired density and fine bubble size, the rate of feed through the blender 13 being controlled to correspond with the speed of travel of the pour belt 10 and the thickness of the finished foam 17a. As the traversing mechanism 15 moves the nozzle 91 back and forth across the pour belt 10, the blended foam 17 is forced through the flexible tube 14 and the nozzle 91 and progressively deposited in the moving open mold cavity bounded by the pour belt 10 and the deckle belts 22.

As the pour belt 10 moves forward the foam 17 banks up behind the first scraper blade 96. The mold cavity is completely and uniformly filled from this constantly renewed bank as the foam 17 is forced to flow down and around the cores 158. The first scraper blade 96 levels the foam 17 to a thickness slightly greater than the desired finished thickness. The foam 17 is then progressively passed beneath the second scraper blade 97 which levels the foam 17 to the desired finished thickness and smooths out any ripples remaining as a result of the operation of the traversing mechanism 15.

The leveled foam 17 is then progressively passed through the high frequency electrical field between the energized plate electrodes 19 and 20 where sufficient heat is generated throughout the foam 17 to rapidly gel it. After a short period of travel beyond the electrodes 19 and 20, the deckle belts 22 are progressively stripped from the foam 17, and the foam continues into the cure oven 23 supported upon the moving pour belt 10. The foam 17 is then progressively passed through the curing oven 23 where it is subjected to sufficient heat for a sufficient period of time to result in a complete cure.

After the cured foam 17a emerges from the cure oven 23, the first few yards are manually stripped from the pour belt 10 and fed on to the transfer conveyor 24. Thereafter, the frictional pull of the belt 139 upon the foam 17a will automatically strip the foam 17a from the pour belt 10. The foam 17a is then passed through a washer 25 and a drier 26. Thereafter, it may be cut into sheets as desired or rolled for packing.

When it is desired to convert the apparatus to the production of continuous sheets of uncored foam rubber or "flatstock," the pour belt 10 is broken, as previously described, and pulled, by means of clamp 141, into the storage position on conveyor belt 12 and storage rack 140. Then, after lowering the deckle belts 22 and making appropriate adjustments in the heighth scraper blades 96 and 97 and plate electrode 19, the flatstock may be poured directly upon belt 11 and processed otherwise in the same manner as the cored foam rubber sheet.

When it is desired to substitute a different pour belt for the pour belt 10, in order to make cored foam sheets of different thickness or core pattern, the pour belt 10 may be simply removed from the apparatus and either stored as an entire belt assembly or disassembled into mat sections for stacked storage.

From the foregoing, it is believed that the method and apparatus for practicing the instant invention will be readily comprehended by persons skilled in the art. It is to be clearly understood, however, that various changes in the apparatus herewith shown and described and in the method of practicing the invention, outlined above, may be resorted to without departing from the spirit of the invention as defined by the appended claims.

Having thus described our invention, what we claim and desire to protect by Letters Patent is:

1. In an apparatus for making cored latex foam, the combination comprising endless flexible belt means for molding said foam substantially to its desired finished shape, said molding means including a substantially nonmetallic, flexible, endless pour belt having integral flexible core projections on one surface thereof, means for progressively pouring a foam of frothed latex upon said molding means, means for progressively leveling said foam so poured, means for progressively gelling said leveled foam, means for progressively curing said gelled foam, driven means for progressively stripping said cured foam from said molding means by pulling said foam from said molding means, the direction in which said foam is pulled from said molding means being at nearly a right angle to the direction of travel of said molding means at the point of stripping, and means for progressively conveying said molding means in an endless path, each point on said molding means being thereby sequentially positioned in cooperative working relation with said means for lubricating, pouring, leveling, gelling, curing and stripping.

2. In an apparatus for making sheets of cored latex foam, the combination comprising a substantially nonmetallic, flexible, endless pour belt having integral nonmetallic flexible core projections on one surface thereof, driven means for causing said pour belt to move in an endless path, means for progressively depositing on said moving pour belt a foam of frothed latex containing a gelling agent, means resting upon each edge of and moving at the same speed as said pour belt for restraining the foam poured on said pour belt from flowing over the edges thereof, means for progressively leveling to desired finished thickness the foam on said moving pour belt, high frequency electrical means for progressively gelling the foam on said moving pour belt, heat curing means for progressively curing said gelled foam on said moving pour belt and driven means for progressively stripping said cured foam from said moving pour belt by pulling said foam from said belt, the direction in which said foam is pulled from said belt being at nearly a right angle to the direction of travel of said belt at the point of stripping.

3. In an apparatus for making sheets of cored latex foam, an endless pour belt comprising a multiplicity of flexible, non-metallic mats, each of said mats having integral finger-like projections on one surface thereof, two rows of said projections along one edge of each said mat being of smaller diameter and lesser height than said projections elsewhere on said mat and two rows of said projections along the opposite edge of each said mat being hollow and open to the surface of each said mat not having projections thereon, said mats being joined together in an endless belt by inserting said smaller diameter projections on each said mat into said hollow projections on the adjacent mat, and a reinforcing strip of relatively unstretchable fabric fitting against the entire surface of said joined mats not having projections thereon, said fabric and said joined mats being fastened together by a plurality of metal staples.

4. In an apparatus for making sheets of cored latex foam, a flexible, non-metallic mat having a pattern of integral projections on one surface thereof, at least some of said projections along one edge of said mat being of smaller diameter and lesser height than said projections elsewhere on said mat and at least some of said projections along the edge of said mat opposite to said aforementioned edge being hollow and open to the flat underside of the mat, said hollow projections being so constructed and arranged as to receive in snug interlock the aforementioned smaller diameter projections on an identical mat.

5. In a pour belt for making cored latex foam sheets comprised of a plurality of flexible mats having integral core projections thereon, a joint between any two of said mats comprising, on one of said mats, two rows of integral resilient projections from a recessed strip of the top surface of said mat, parallel to one edge thereof, said projections being of lesser height and diameter than the core projections elsewhere on said top surface of said mat, and, on the other mat, two rows of integral resilient projections located on a strip of said mat parallel to one edge thereof which is of reduced thickness by virtue of a recessed strip in the undersurface of said mat, said last mentioned two rows of projections being externally identical to the core projections elsewhere on said mat but being provided with cylindrical recesses open to the recessed undersurface of said mat, said recessed strips on both mats, said two rows of projections of lesser height and diameter and said two rows of cylindrical recesses being so constructed and arranged that said last mentioned projections may be received in tight interlock in said cylindrical recesses and said recessed strips will mate without appreciable interruption of the pattern of core projections or variation in combined thickness of said mats across said joint.

6. In an apparatus for making sheets of cored latex foam, an endless pour belt comprising a multiplicity of flexible, non-metallic mats, each of said mats having integral finger-like projections on one surface thereof, at least one row of said projections along one edge of each said mat being of smaller diameter and lesser height than said projections elsewhere on said mat and at least one row of said projections along the opposite edge of each said mat being hollow and open to the surface of the mat not having projections thereon, said mats being joined together in an endless belt by inserting said smaller diameter projections on each said mat into said hollow projections on the adjacent mat.

References Cited in the file of this patent

UNITED STATES PATENTS

| | | |
|---|---|---|
| Re. 16,008 | Debay | Feb. 24, 1925 |
| 60,050 | Pease | Nov. 27, 1866 |
| 285,952 | Barnard | Oct. 2, 1883 |
| 2,022,784 | Rice | Dec. 3, 1935 |
| 2,123,893 | Guba | July 19, 1938 |
| 2,308,951 | Novotny et al. | Jan. 19, 1943 |
| 2,441,235 | Blair et al. | May 11, 1948 |
| 2,757,415 | Mathues et al. | Aug. 7, 1956 |
| 2,822,573 | Wasniewski et al. | Feb. 11, 1958 |
| 2,891,284 | Levin et al. | June 23, 1959 |
| 2,926,719 | Matthews | Mar. 1, 1960 |

FOREIGN PATENTS

| | | |
|---|---|---|
| 766,320 | Great Britain | Jan. 23, 1957 |

UNITED STATES PATENT OFFICE
CERTIFICATE OF CORRECTION

February 5, 1963

Patent No. 3,076,226

Robert O. Borton et al.

It is hereby certified that error appears in the above numbered patent requiring correction and that the said Letters Patent should read as corrected below.

Column 1, line 53, for "take" read -- taken --; column 2, line 54, for "for", first occurrence, read -- nor --; column 8, line 28, strike out "lubricating,"; line 33, after "metallic" insert a comma.

Signed and sealed this 12th day of November 1963.

(SEAL)
Attest:
ERNEST W. SWIDER
Attesting Officer

EDWIN L. REYNOLDS
Acting Commissioner of Patents